United States Patent [11] 3,632,474

[72] Inventors Sumio Kurihara;
Kazumi Araki; Hiroyuki Ueda; Masahiko Ikumo, all of Hofu-shi, Japan
[21] Appl. No. 811,596
[22] Filed Mar. 28, 1969
[45] Patented Jan. 4, 1972
[73] Assignee Kyowa Hakko Kogyo Kabushiki Kaisha Tokyo, Japan
[32] Priority Mar. 29, 1968
[33] Japan
[31] 43/20056

[54] PROCESS FOR PRODUCING IMIDAZOLE-GLYCEROL BY FERMENTATION
8 Claims, No Drawings

[52] U.S. Cl. .................................................. 195/29
[51] Int. Cl. ...................................................... C12d 13/00
[50] Field of Search ........................................... 195/29, 30

[56] References Cited
UNITED STATES PATENTS
3,329,577  7/1967  Okumura et al. ............. 195/29

Primary Examiner—Lionel M. Shapiro
Assistant Examiner—J. M. Hunter
Attorney—Meyer A. Gross ABSTRACT: A process for producing imidazole-glycerol by fermentation including culturing a mutant strain of a microorganism belonging to the genus *Brevibacterium* or *Corynebacterium* capable of producing imidazole-glycerol in a medium containing a histidine-containing compound.

3,632,474

PROCESS FOR PRODUCING IMIDAZOLE-GLYCEROL BY FERMENTATION

BACKGROUND OF THE INVENTION

Imidazole-glycerol is one of the components of imidazole-glycerol-phosphoric acid which is a precursor for the biosynthesis of histidine, one of the essential amino acids. Further, it is useful as raw material for histidine and nitroimidazole compounds.

It is known that imidazole-glycerol is formed in microbial cells or culture medium by culturing the mutant strains of the micro-organisms belonging to the genus Neurospora or Penicillium [J. of A. Chem. Soc. 75, 1015 (1953)]. But in this case, only a small amount of imidazole-glycerol was found among various accumulated substances such as imidazole-acetol, histidinol etc., so that it is difficult to apply this prior-art process to commercial production of imidazole-glycerol.

An object of this invention is to provide a process for producing imidazole-glycerol whereby a large yield of imidazole-glycerol can selectively be accumulated in the culture medium without any normal difficulty.

SUMMARY OF INVENTION

It has now been discovered that a substantially large amount of imidazole-glycerol can advantageously be accumulated in the culture medium without the substantial accumulation of other byproduced imidazole compounds by means of culturing a histidine-requiring mutant strain of a micro-organism belonging to the genus Brevibacterium and Corynebacterium, preferably *Brevibacterium ammoniagenes* or *Corynebacterium glutamicum* in a culture medium containing carbon source, nitrogen source, inorganic substance as well as traceable amounts of suitable nutrients.

Micro-organisms which may preferably be used for the purpose of this invention can be exemplified by *Brevibacterium ammoniagenes* H-5068 (histidine-requiring mutant strain), *Corynebacterium glutamicum* MF-134-No. 47 (histidine-requiring mutant strain). These micro-organisms are freely available to the public, and are freely obtainable from the American Type Culture Collection under the following ATTC identification numbers:

*Brevibacterium ammoniagenes* ATCC 21225
*Corynebacterium glutamicum* ATCC 21224.

They are nutrient-requiring mutant strains derived from *Brevibacterium ammoniagenes* or *Corynebacterium glutamicum* by UV irradiation and are distinguishable from the parent strains with regard to the requirement for histidine and to their ability of producing imidazole-glycerol.

The bacteriological properties of the aforementioned *Brevibacterium ammoniagenes* have been reported by Bergeys Manual of Determinative Bacteriology, 7th Edition.

The bacteriological properties of *Corynebacterium glutamicum* are found in Japanese Patent Publication No. 8698/1957, in which Micrococcus glutamicus is described. Kinoshita et al. have recently conducted bacteriological and taxological studies in these micro-organisms and have reported in The Journal of General and Applied Microbiology, Vol. 18, 279–301 (1960) etc., that this micro-organism should be renamed as *Corynebacterium glutamicum*. In this specification, this strain is therefore designated as *Corynebacterium glutamicum*.

Any carbon sources which may be used for culturing the aforementioned parent strains can be used for the purpose of this invention. Preferred carbon sources include, for example, glucose, fractose, galactose, succrose, maltose, trehalose, cellobiose, arabinose etc. Preferable nitrogen sources include, for example, ammonia, urea, ammonium sulfate, ammonium chloride, ammonium acetate, ammonium citrate and various other organic or inorganic nitrogen-containing compounds. Preferable inorganic materials can be exemplified by various salts of sodium, potassium, manganese, magnesium, calcium, cobalt, nickel, copper, chlor, sulfuric acid, phosphoric acid etc. For the purpose of inhibiting the accumulation of other imidazole compounds or accumulating selectively imidazole-glycerol, it is particularly advantageous to add to the medium a suitable phosphate in an amount of more than 0.05 mol (calculated as phosphoric acid ion) per 1 liter of the medium. Examples thereof are potassium hydrogen phosphate, potassium dihydrogen phosphate, sodium dihydrogen phosphate, ammonium dihydrogen phosphate etc.

It is necessary to add to the medium histidine or histidine-containing nutrient for growth of the strain according to the present invention. It is also possible to use as the histidine-containing material various organic substances containing histidine such as, for example, corn steep liquor, peptone, meat extract, soybean meal hydrolysate, casein hydrolysate, hydrolysate of microbial cells, yeast extract etc., in a preferable amount of 50–3,000 γ/ml. of the medium, calculated as histidine. In addition, it is also preferred to add to the medium a traceable amount of at least one member of the following compounds: biotine, thiamine, β-alanine, nicotinic acid, derivatives of nicotinic acid, hypoxanthine, adenine, guanine, xanthine and other nucleic-acid-relating bases and their derivatives.

The strain according to this invention is cultured aerobically with shaking or aeration at a generally neutral pH, e.g., preferably a pH of about 6.0–8.5. The cultivation is continued at 23°–40° C., preferably at 26°–35° C. A suitable neutralizing agent such as e.g., ammonia, sodium hydroxide, potassium hydroxide, calcium hydroxide etc., can be added to the medium and it is also possible to control the pH of the medium and to supply with ammonia by addition of urea to the medium. The cultivation is continued for a time sufficient to accumulate a sufficient amount of imidazole-glycerol in the medium. This range is preferably 3 to 7 days.

After completion of the cultivation, sometimes the medium contains one to three types of byproduct imidazole compounds. But the amounts of the byproduct imidazole compounds are usually not more than one-tenth of the amount of the accumulated imidazole-glycerol and it is possible to accumulate selectively and sufficiently the imidazole glycerol for example, by increasing the concentration of the phosphoric acid contained in the medium.

Various known methods for concentrating the imidazole-glycerol can be employed. For example, the separation of imidazole-glycerol as an insoluble salt (e.g., mercury salt), extraction purification, or the use of ion exchange resin, or a combination thereof can be applied to treat the cultured medium in order to obtain purified crystals of imidazole-glycerol.

The following examples illustrate the invention.

EXAMPLE 1

A strain of *Brevibacterium ammoniagenes* H-5068 (ATCC 21225) was inoculated in a medium having the following composition (pH 7.2) and cultured for 24 hours to obtain a seed culture.

Each 20 ml. of culture medium having the following composition was poured into each of Sakaguchi flask (capacity— 500 ml.) and was sterilized. After this each culture medium was inoculated with the said seed culture (1 ml.) and the cultivation was carried out for 5 days at 28° C. to obtain 6.8 mg./ml. (in average) of imidazole-glycerol in the media in the flasks.

Composition of Seed Medium

Glucose 5 dl., $KB_2PO_4$ 0.1 g./dl., $MgSO_4 \cdot 7H_2O$ 0.0004 g./dl., biotine 30 γ/l, β-alanine 0.0005 g./dl., Thiamine-HCl 0.0005 g./dl., peptone 2g./dl., meat extract 1 g./dl., urea 0.3 g./dl., histidine-HCL 0.0001 g./dl., sodium succinate.$6H_2O$ 0.03 g./dl.

Composition of Culture Medium

Glucose 12 g./dl., $(NH_4)_2SO_4$ 2 g./dl., urea 0.3 g./dl., $KH_2PO_4$ 2 g./dl., $Na_2HPO_4 \cdot 12 H_2O$ 2 g./dl., $MgSO_4 \cdot 7H_2O$ 2 g./dl., β-alanine 0.0005 g./dl., L-cystine 0.002 g./dl., nicotinic acid amide 0.0005 g./dl., $FeSO_4 \cdot 7H_2O$ 0.001 g./dl., $ZnSO_4 \cdot 7H$ 2o 0.001 g./dl., MnSO$_4$·4H$_2$O 0.0004 g./dl., biotin 30 γ/l., thiamine HCl 0.0005 g./dl., L-histidine-HCl 0.1 g./dl., meat extract 0.2 g./dl., CaCO$_3$ 2 g./dl.

AFter completion of the cultivation the fermentation liquor was collected and combined to 1 liter. The combined liquor was centrifuged to remove microbial bodies. After this to the liquor was added a saturated solution of barium hydroxide to adjust the pH at 8.5, and the liquor left for a night. The precipitates were filtered. To the filtrate was added 25 percent mercuric chloride-ethanol solution to give precipitated imidazole-glycerol (mercury salt), which was separated by filtration and dried in vacuo at ambient temperature 0.5N hydrochloric acid was added to the dried material to dissolve imidazole-glycerol, which was then filtered to remove insoluble impurities. Into the filtrate was blown hydrogen sulfide to obtain precipitates. The precipitates were filtered and the thus obtained filtrate was concentrated in vacuo to give an amount of about 50 ml., the concentrated liquor was passed through a resin column packed with Dowex-50 (a strongly acidic cation exchange resin available from Dow Chemical Co., U.S.A.) in its free form to adsorb imidazole-glycerol. The resin was washed with water and eluted with 1.5N hydrochloric acid. The fractions containing imidazole-glycerol were collected, combined and concentrated. After separating by crystallization, there was obtained crude crystals of imidazole-glycerol (5.8 g.).

EXAMPLE 2

A seed culture was prepared in a similar manner to that described in example 1 with the exception of the use of *Corynebacterium glutamicum* MF–134–No. 47 (ATCC 21224) strain in place of the strain used in example 1.

The composition of the culture medium was as follows:
glucose 12 g./dl., urea 0.9 g./dl., meat extract 2.5 g./dl., β-alanine 0.0005 g./dl., thiamine-HCl 0.0005 g./dl., L-cystine 0.002 g./dl., FeSO$_4$·7H$_2$O 0.001 g./dl., ZnSO$_4$·7H$_2$O 0.001 g./dl., MnSO$_4$·4H$_2$O 0.0004 g./dl., biotine 30 γ/l., hypoxanthine 0.005 g./dl., KH$_2$PO$_4$ 2 g./dl., Na$_2$HPO$_4$·12H$_2$O 2g./dl., MgSO$_4$·7H$_2$O 2 g./dl.

Each 2 ml. of the culture medium was poured into each Sakaguchi flask (capacity—500 ml.) and sterilized (the urea was separately sterilized and added). After sterilization, each flask was inoculated with the said seed culture (1 ml.) The cultivation was carried out with shaking at 28° C. for 6 days. The fermented liquor contained 8.3 mg./ml. of imidazole-glycerol.

Various modifications of the present invention will suggest themselves to those skilled in the art.

What is claimed is:

1. A process for producing imidazole-glycerol by fermentation, which comprises culturing a histidine-requiring strain capable of producing imidazole-glycerol selected from the group consisting of the genus *Brevibacterium* and *Corynebacterium* in a culture medium comprising a histidine-containing nutrient and recovering the accumulated imidazole-glycerol from the fermented liquor.

2. The process of claim 1 wherein the micro-organisms strain is selected from the group consisting of *Brevibacterium ammoniagenes* and *Corynebacterium glutamicum*.

3. The process of claim 1 wherein up to 0.05 mol/liter of culture medium of a phosphate compound is present to enhance production of imidazole-glycerol.

4. A process for producing imidazole-glycerol which comprises culturing a strain of a micro-organism belonging to a genus selected from the group consisting of *Brevibacterium ammoniagenes* and *Corynebacterium glutamicum* in a culture medium containing a histidine-containing compound.

5. The process of claim 4 wherein said culture medium also contains a phosphate compound in an amount of up to 0.05 mol/liter of medium to enhance production of imidazole-glycerol.

6. The process of claim 4 wherein culturing is affected under aerobic condition at a generally neutral pH.

7. The process of claim 4 wherein culturing is effected at 23° to 40° C., at a pH 6.0 to 8.5 for a time sufficient to accumulate sufficient amounts of imidazole-glycerol for recovery.

8. A process for producing imidazole-glycerol which comprises culturing a strain of a micro-organism belonging to a genus selected from the group consisting of *Brevibacterium ammoniagenes* and *Corynebacterium glutamicum* in a culture medium containing a histidine-containing compound under aerobic conditions and temperatures of 23° to 40° C. and a pH of 6.0 to 8.5 for a time sufficient to accumulate sufficient imidazole-glycerol for recovery, said culture medium containing a phosphate compound in an amount of up to 0.05 mol/liter of medium, and recovering imidazole-glycerol from said medium by precipitation.

* * * * *